UNITED STATES PATENT OFFICE.

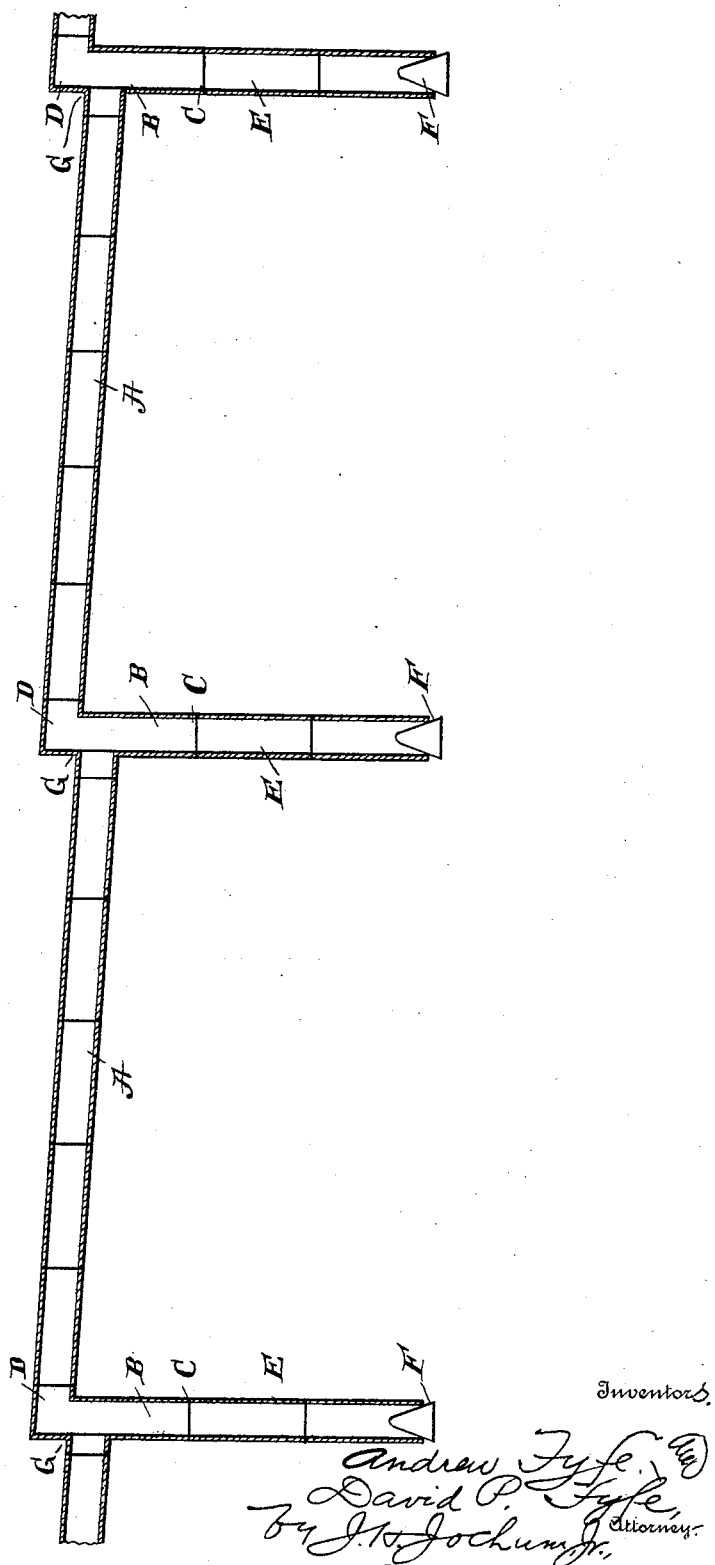

ANDREW FYFE AND DAVID PAXTON FYFE, OF CANTERBURY, NEW SOUTH WALES.

SYSTEM OF AUTOMATIC SUBIRRIGATION.

SPECIFICATION forming part of Letters Patent No. 633,378, dated September 19, 1899.

Application filed December 22, 1898. Serial No. 700,000. (No model.)

*To all whom it may concern:*

Be it known that we, ANDREW FYFE and DAVID PAXTON FYFE, subjects of the Queen of Great Britain and Ireland, residing at George street, Canterbury, New South Wales, have invented an Improved System of Automatic Subirrigation, (for which we applied for a patent in New South Wales on the 11th day of June, 1898, and numbered 8,424,) of which the following is a specification.

The objects of the invention are the subirrigating of land of any kind and configuration, for commercial purposes or otherwise, by a system which once established works automatically, the system possessing the adaptability for drainage contemporaneous with the irrigation.

The drawing which forms part of the specification illustrates in longitudinal section two joints or portions of the main aqueducts with junction-boxes and branches at both ends, and the arrow indicates the direction in which the water will flow.

The nature of the invention lies in the water being led by gravitation and forced into the ground by its own weight by means of a system of subspaces or subaqueducts, comprising what we will call "main aqueducts," which are open at the lower ends, with branch aqueducts having dead ends leading at intervals from the main ones, the main aqueducts being supplied with the necessary supply of water by what we will call "feeding-aqueducts," (not shown,) from which the main aqueducts branch at an angle which the configuration of the land determines. The supply of water passing out of the feeding-aqueducts to the main aqueducts is rendered just sufficient by means of a mechanical arrangement called a "box-junction," hereinafter described. The feeding-aqueducts are also open at the lower ends, abutting in open drains the same as the main ones. The branch aqueducts leading from the main ones are connected with the main ones by a junction hereinafter described or a mode of shaping the aqueducts or laying the aqueducts so that the water in gravitating in the aqueducts is forced to supply the branch it encounters first to the utmost of its weight before it can escape and proceed to supply the next branch aqueduct, and so on. The end of the branch aqueduct with its dead end is at a lower level than its junction with the main aqueduct, and that provides the weight above referred to or the hydrostatic pressure necessary to force some water out at the dead end or wherever it can escape in the aqueducts, the depletion in each branch by soakage being constantly made good by the constant flow of water. The beginning of the feeding-aqueducts must be at the highest points of the land and run down the steepest slope of the land, and the main aqueducts run at an angle from the feeding ones at a more gentle slope. There is nothing arbitrary in the exact directions the different aqueducts will take, either the main aqueducts, the feeding ones, or the branches, further than the configuration of the land demands and judgment in the best mode to place the aqueducts both for effectiveness and economy. The branch aqueducts end at a lower level than their junction with the main ones; but that level must be such as not to cause the water to flow out on the top of the ground by hydrostatic pressure, care being taken that the land near the surface is only irrigated by gentle capillary force. The exact amount of water necessary to irrigate a given piece of land, or, rather, the amount necessary to constantly keep every branch aqueduct in the whole system full, is shown mathematically by a small escape of surplus water at the ends of the main aqueducts and at the ends of the feeding-aqueducts. When the water from the source of supply is led into the feeding-aqueduct at the highest point, it will gravitate to the first box-junction, which feeds the first main aqueduct. The amount of water necessary to supply the branch aqueducts abutting from the first main aqueduct is allowed to escape from the box-junction. The rest overflows and gravitates to the next box-junction, which supplies the next main aqueduct, and so on. If the water flowing down the feeding-aqueducts and coming out at the ends of these aqueducts into the drain is excessive, it can be reduced at the source of supply or anywhere else convenient until just a trickle escapes, which trickle will show that the whole system has sufficient water. The irrigation need not be stopped either in wet weather or dry. When the weather is sufficiently wet for the main aqueducts to be brought into requisition as drains, the branches being full and the soakage necessarily being slow, the drainage-water would be run off the land.

In cases where the irrigation-water is carried in waterproof pipes it will be necessary to have independent drains, provided there is not a natural subsoil drainage.

In cases where the water has to be paid for by measurement it may be turned off when not necessary.

To explain our invention, we will first refer to the different mechanical portions of the system for the distribution of the water and then to the depth the aqueducts may be in the ground and the distances they may be apart, or, in other words, to the number of feeding, main, and branch aqueducts in a given piece of land. The feeding-aqueduct may be constructed of a line of drain-pipes A A, of any material or shape, to carry the water intersected at required distances by box-junctions B, from the upper end of which the main aqueducts A branch at an angle. The beginning of the feeding-aqueduct must be of sufficient capacity to carry by easy gravitation the whole of the water necessary to constantly supply all the main aqueducts from the box-junctions. The end of the feeding-aqueduct need not have capacity greater than is required to supply the last main aqueduct. Thus to save expense it may gradually be reduced in size as the water gravitating along it diminishes. The box-junction B may be of any desired material and shape, so long as it has an exit C at the bottom of it for the supply from the main aqueduct and another or overflow exit D near the top for the surplus water to proceed to the next box-junction. The exit in the bottom of the branch E should be shaped so as to admit of an easy reduction in size by plugs or obstructions F, so as to regulate the amount of water required to satisfy all the branches in the main aqueduct and also a slight surplus to show that all are satisfied.

It is advisable to have access to the box-junctions that will cause no inconvenience to plows or harrows, as the feeding-aqueducts from their functions in the system will occupy the side boundary of the land, or they may run alongside roads. A means of access to the box-junctions is not absolutely necessary. Only it may be more convenient for the regulation of the supply to the main aqueducts, which supply when once fixed need not again be meddled with. The main aqueduct is laid so that when the water flowing along it comes to the first junction-box it will be guided therein and flow by gravitation along it until it is obstructed at the lower end of the branch pipe E and is then forced to rise in said pipe until it passes out at D along the main aqueduct to the next junction-box, where its progress will be arrested as before. The supply-pipe joins the junction-box at a point between its ends and a short distance from the top, as at G, so as to stand below the overflow-exit D, in such a way that the course of the water is so arrested that it is compelled to fill the branches E before it can proceed to the next box. The pipe A, which joins the overflow-exit of one box to the entrance of another, forms an inclined way. The branch pipes E have a plug F, with its peak in the pipe, so that in all cases the water will escape between the two surfaces, or, if desired, a flat stone may be used. The cap or the stone at the dead end of the branch when used is for the sake of cleanliness in the turmoil of water in the pipes.

The drawing illustrates a portion of the main aqueduct with its branches, showing how the water will flow directly into the branch and can only escape after it has risen to the highest portion of the branch, when it will proceed to the next box. There are many mechanical shapes the main aqueduct may take which will result in the same behavior of the water; but the drawing shows an advisable shape.

It is advisable to place the main aqueducts well below the deepest plowing and well beyond the reach of any subsoil-plow. If the soil is very deep and free, the pipes deep in the ground with longer branches than usual will have magnificent results. If the soil is shallow, with a hard unkind subsoil, deep plowing is necessary for success.

With reference to the distances the main aqueducts may be apart, that is governed by the soil, its depth and location, and the kind of plants that are to be grown as to their thirst for water and also to the climate. In a dry hot climate thirty feet between the main aqueducts with the water constantly flowing is generally sufficient, but where the necessities of the crops grown are greater they may be placed closer. Thirty feet in a stiff soil is a fair distance for drainage, and as the aqueducts may act as drains that would be convenient. It is advisable to put the branches from the first main aqueduct closer or more numerous than those from the other main aqueducts—say five feet for the first and eight feet for the others. The system lends itself to any configuration of land and may be adapted with economy on plans endless in variety. Small portions of land of awkward shape and location may be irrigated by using a main aqueduct in conjunction with long branch aqueducts and short branches leading from the long ones. There are also many cases where one main aqueduct with short branches along the highest portion of the land is all that is required. In laying a block of land with the long branches with the small branches abutting therefrom it is necessary to well observe the laws of hydrostatics, as too great a body of water forced into the ground at once is undesirable—in fact, to be avoided.

The aqueducts are laid in trenches cut in position to receive them. The trenches need not be any wider at the bottom than is necessary for the size of the pipes. With reference to drainage, if waterproof pipes are not used drainage is contemporaneous with the irrigation. If waterproof pipes are used, drain-pipes may be laid in the same trench and on the up side of the main aqueducts. Waterproof pipes may be used where the plants to be irrigated are permanent trees or vines. Ordinary drain-pipes may be cemented together. Of course the cap in all cases is only placed in position to allow of the escape of water. If the system is laid on land absolutely flat, all that is required is to cut the trenches to receive the aqueducts lower at the one end than the other, so as to give a fall to the water. Should the system by some error not be working at any point, it will at once be evinced by water on the top of the ground.

In all cases of subirrigation by pipes it is advisable to use water free from sediment. This is easily secured by a simple arrangement. There is a considerable scourage in the pipes by the turmoil of the water in its course.

The system, if well and properly laid, is permanent, insures perfect subirrigation, is economical in application, the water used being at once absorbed, and is automatic in its action, the exact amount of water necessary for a given portion of land where the system is used being regulated at the source of supply when the system is instituted.

Having now described our invention, what we claim as new, and desire to secure by Letters Patent, is—

1. The herein-described irrigating system consisting of a supply-pipe, a series of junction-boxes provided with an entrance and two exit openings, said entrance being located near the top of the boxes, a pipe leading downward from one exit, and an inclined connecting-pipe between the other exit and the entrance of the next box, substantially as and for the purposes set forth.

2. The herein-described irrigating system consisting of a supply, a series of junction-boxes, an exit at the top and at the bottom of the boxes, an entrance also near the top of the boxes between the exits, and a pipe connecting the top exit of one box with the entrance of the next box, substantially as and for the purposes set forth.

3. The herein-described irrigating system consisting of a supply and a series of junction-boxes, an exit at the bottom of the boxes and an obstructed pipe leading therefrom into the ground, an overflow-exit near the top of the boxes, an entrance also near the top but below the exit, and a pipe connecting the overflow-exit of one box with the entrance of the next box, substantially as and for the purposes set forth.

4. In an irrigating system, the combination with a supply, a series of junction-boxes, an entrance, an overflow-exit therein, and inclined pipes connecting the overflow-exit of one box with the entrance of the next; of branch pipes leading from the base of the boxes downward into the ground, and means at the lower end of the branches for regulating the exit of the water, substantially as and for the purposes set forth.

5. In an irrigating system, the combination with a supply, a series of junction-boxes, an entrance, an overflow-exit, and pipes connecting the overflow of one box with the entrance of another; of branch pipes leading from the bottom of the box and plugs in the ends of said branch pipes, substantially as and for the purposes set forth.

In witness whereof we have hereunto set our hands in presence of two witnesses.

ANDREW FYFE.
DAVID PAXTON FYFE.

Witnesses:
W. C. HILL,
J. A. CATON.